United States Patent Office 3,600,157
Patented Aug. 17, 1971

3,600,157
RARE EARTH ADDITIONS TO URANIUM AND URANIUM ALLOYS
George E. Jaynes, Los Alamos, N. Mex., assignor to the United States of America as represented by the United States Atomic Energy Commission
No Drawing. Filed May 7, 1969, Ser. No. 822,695
Int. Cl. C22c 27/00
U.S. Cl. 75—122.7                     5 Claims

ABSTRACT OF THE DISCLOSURE

Yttrium or lanthanide rare earth metals are added to uranium and uranium alloys in the range of 0.1 to 0.3 weight percent. Nickel, cobalt, and rhodium are used as carrier metals for the rare earths.

---

The invention described herein was made in the course of, or under, a contract with the U.S. Atomic Energy Commission.

The addition of yttrium or lanthanide rare earth metals to uranium and uranium alloys is primarily to determine reactor fluxes and as a diagnostic tool to determine neutron fluxes generated by a nuclear explosion.

It is well known in the metallurgical art to employ carrier metals which are soluble in the desired metal and to use these carriers to alloy relatively insoluble metals. The inventor has found a method of adding small amounts of rare earths of the lanthanide series of metals to uranium or uranium alloys by using nickel, cobalt, and rhodium as carriers.

Yttrium or the lanthanide rare earth metals are added to a carrier metal which is soluble in molten uranium. This rare earth carrier metal button is introduced to the uranium melt in the last few minutes prior to induction stirring of the melt and pouring. Chill casting is also beneficial in that it prevents liquation of the rare earth during solidification of the melt. The melting procedure is to first melt the carrier metal under a positive argon pressure of 5 pounds. The molten carrier metal is then moved by moving the electrode to come in contact with the rare earth until the rare earth addition is completely absorbed. Care is taken not to strike the arc directly on the rare earth metal. The buttons are then remelted twice using reverse stirring to insure homogeneity of the melt. The weight ratio of carrier metal to rare earth is approximately 2 to 1. The carrier metals used in this process are: nickel, cobalt, and rhodium. These carrier metals are partially soluble in uranium and also exhibit partial solubility for the rare earths.

It is therefore an object of this invention to provide a method of adding yttrium or lanthanide rare earth metals to uranium and uranium alloys.

It is a further object of this invention to provide a novel composition of matter being 0.1 to 0.3 weight percent of yttrium or the lanthanide rare earth metals, 0.2 to 0.6 weight percent of nickel, cobalt or rhodium, and the balance being uranium or a uranium alloy.

Other objects of this invention will be apparent from the following description of the preferred embodiment.

The alloy charge of uranium and the arc melted button consisting of yttrium or one of the lanthanide series being present in the range of 0.1 to 0.3 weight percent and the carrier metal being present in the range of 0.2 to 0.6 weight percent are loaded into the furnace. The furnace is pumped down to a pressure of 50μ or less. The furnace is heated to a temperature of approximately 800° C. before the vacuum valve is closed and argon gas is introduced into the furnace. The furnace is then pressurized to a maximum of 25 p.s.i. before the temperature of the uranium metal is increased. The rare earth additions are made in the period between the induced stirring action and the pour. Alloying takes place between the superheat temperature (1500–1750° C.) and the final pour temperature (1450° C.). The stirring time is dependent on the temperature differential between superheat and pour heat. To reduce segregation, low frequency induction stirring of the molten metal in the crucible is used in all casting work. By this technique, yttrium, lutetium, or thulium were readily added to uranium and uranium alloys.

What I claim is:

1. A method of adding a rare earth metal selected from the class consisting of yttrium and the lanthanide rare earth metals to uranium and uranium alloys comprising adding 0.1 to 0.3 weight percent of a rare earth, said rare earth being contained in a carrier metal in the weight ratio of 2 to 1 selected from the class consisting of nickel, cobalt, and rhodium, and in which the carrier metal containing the rare earth is added to the uranium at a temperature in the range of 1500° C. to 1750° C., cooled to 1450° C., poured at this elevated temperature into a mold, and then chilled rapidly to room temperature.

2. The method of claim 1 in which said rare earth is thulium.

3. The method of claim 1 in which said rare earth is lutetium.

4. The method of claim 1 in which said rare earth is yttrium.

5. A composition of matter consisting of 0.1 to 0.3 weight percent of at least one rare earth selected from the class consisting of yttrium and the lanthanide rare earth metals, 0.2 to 0.6 weight percent of at least one carrier metal selected from the class consisting of nickel, cobalt, and rhodium, and the balance being uranium.

References Cited
UNITED STATES PATENTS 3,043,727   7/1962   Elliott et al. _____ 75—122.7X
3,109,730   11/1963  Zegler _____ 75—122.7X CARL D. QUARFORTH, Primary Examiner
R. L. TATE, Assistant Examiner U.S. Cl. X.R.
250—83.1